United States Patent [19]

Kozakae

[11] Patent Number: 4,644,828

[45] Date of Patent: Feb. 24, 1987

[54] STEPLESS SPEED CHANGE DEVICE FOR BICYCLE

[75] Inventor: Kunitoshi Kozakae, Ageo, Japan

[73] Assignee: Bridgestone Cycle Co., Ltd., Tokyo, Japan

[21] Appl. No.: 718,097

[22] Filed: Apr. 1, 1985

[30] Foreign Application Priority Data

Apr. 10, 1984 [JP] Japan .................. 59-69906
May 15, 1984 [JP] Japan .................. 59-95750

[51] Int. Cl.$^4$ ............................................. F16H 3/44
[52] U.S. Cl. ..................... 74/750 B; 74/117; 74/802; 74/804
[58] Field of Search ............ 74/63, 125.5, 394, 750 R, 74/750 B, 773, 802, 804, 117, 123, 124

[56] References Cited

U.S. PATENT DOCUMENTS

| | | | |
|---|---|---|---|
| 3,874,253 | 4/1975 | Waddington | 74/750 B X |
| 4,098,147 | 7/1978 | Waddington | 74/750 B |
| 4,181,043 | 1/1980 | Waddington | 74/750 B |
| 4,277,986 | 7/1981 | Waddington | 74/750 B |
| 4,283,969 | 8/1981 | Lapeyre | 74/750 B X |
| 4,299,581 | 11/1981 | Korosue | 74/117 X |
| 4,376,394 | 3/1983 | Lapeyre | 74/750 B |

FOREIGN PATENT DOCUMENTS

| | | | |
|---|---|---|---|
| 2205322 | 8/1972 | Fed. Rep. of Germany | 74/117 |
| 2317061 | 10/1973 | Fed. Rep. of Germany | 74/117 |
| 54-93754 | 7/1979 | Japan . | |
| 412050 | 6/1934 | United Kingdom | 74/117 |

Primary Examiner—Leslie Braun
Assistant Examiner—Dwight G. Diehl
Attorney, Agent, or Firm—Parkhurst & Oliff

[57] ABSTRACT

A stepless speed change device for a bicycle comprises a plurality of planetary members journaled in a carrier fixed to a crankshaft of the bicycle in two parallel planes perpendicular to the crankshaft, planetary gears respectively fitted on the planetary members through one-way clutches so as to rotate in one direction, an eccentric shifter having a circular track for guiding rocking pins extending from and eccentric to the planetary members, the eccentric shifter capable of changing its eccentricity relative to the crankshaft and a sun gear connected to a crank gear as an output portion of the device, thereby making it possible to make the diameters of the planetary gears much larger than that of the sun gear so as to make much larger the speed-up transmission ratio and at the same time increase the number of planetary gears to make small pulsations in transmission force. According to the invention, the device includes a speed change operating device having for itself a performance of a reverse input allowing device so as to effectively bring the stepless speed change device into practical use. In this manner, the stepless speed change device becomes light weight and small-sized as a whole.

8 Claims, 18 Drawing Figures

FIG_1a

FIG_1b

FIG_1c

FIG_2

FIG_3

FIG_11

STEPLESS SPEED CHANGE DEVICE FOR BICYCLE

BACKGROUND OF THE INVENTION

1. Field of the Invention

This invention relates to a stepless speed change device arranged on a crankshaft of a bicycle and more particularly to a speed change operating and reverse input allowing device for the stepless speed change device of a bicycle, in order to avoid a self-rocking of the mechanism when a crank gear is subjected to a reverse input.

2. Description of the Prior Art

Such a stepless speed change device for a bicycle has been known for example by Japanese Laid-open Patent Application No. 54-93,754, which is provided on a rear hub spindle of a bicycle.

With a bicycle, in general, a diameter of a crank gear is much larger than that of a rear hub sprocket because the rotation of the crankshaft is increasingly transmitted to a rear wheel. When such a speed change device is provided on the rear hub spindle of the bicycle, a diameter of the rear hub sprocket becomes somewhat larger and hence a diameter of a crank gear becomes larger, so that the transmission device becomes larger.

Moreover, such a transmission device generally uses a planetary gear assembly to increase its transmission speed. This increased transmission ratio is determined by a ratio of a diameter of planetary gears to a diameter of a sun gear and pulsations become small with an increase in the number of planetary gears used.

Figure 1A:
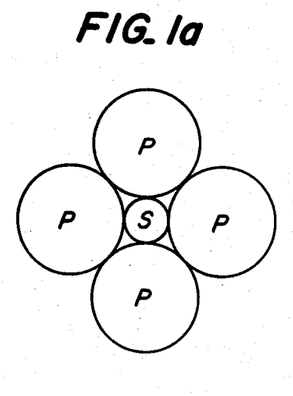
FIGS. 1a, 1b and 1c are schematic views illustrating conventional arrangements of planetary gears and sun gears arranged in the same plane.
Figure 1B:
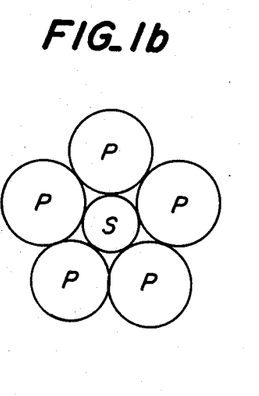
Figure 1C:
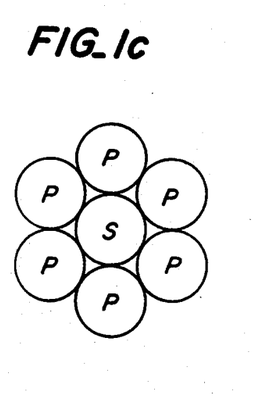

In the event that all the planetary gears and the sun gear are arranged in a plane as in the above stepless speed change device, if the number of the planetary gears P is increased, a diameter of the sun gear S becomes larger to make small the speed-up transmission ratio, while if diameters of the planetary gears P are made larger in comparison with that of the sun gear S so as to make larger the speed-up transmission ratio, the number of planetary gears P becomes less to make large the pulsations as shown in FIGS. 1a-1c.

SUMMARY OF THE INVENTION

It is a primary object of the invention to provide an improved stepless speed change device for a bicycle adapted to be mounted on a crankshaft of the bicycle, the improved speed change device being small as a whole and having planetary gears which are duplicately arranged relative to the crankshaft so as to make the diameters of the planetary gears much larger than that of a sun gear to thereby increase the increased transmission ratio and the number of the planetary gears and make small the pulsations in transmission force.

In order to achieve this object, a stepless speed change device for a bicycle according to the invention comprises a carrier fixed to a crankshaft for the bicycle, a plurality of planetary members rotatably journaled in said carrier in two parallel planes perpendicular to said crankshaft, planetary gears respectively fitted on said planetary members through one-way clutches so as to rotate in one direction rocking pins eccentric to and extending from said planetary members, an eccentric shifter having a circular track for guiding said rocking pins and enabling its eccentricity relative to said crankshaft to change, and a sun gear in mesh with said planetary gears and integrally connected to a crank gear as an output portion of the device.

In a preferred embodiment of the invention, the planetary members comprise reduced diameter portions and enlarged diameter portions on which the planetary gears are arranged, and the planetary members are arranged in such a manner as to alternately reverse adjacent members' enlarged diameter portions and reduced diameter portions so as to be in the two parallel planes.

In the embodiment, six planetary members and six planetary gears are provided, and among them three planetary gears are arranged on an outer side in the carrier, while the remaining three planetary gears are arranged on an inner side in the carrier.

It is another embodiment of the invention to provide a stepless speed change device including a speed change operating device capable of being used as a reverse input allowing device so as to bring the stepless speed change device utilizing the planetary gears into practical use effectively.

For this purpose, in an embodiment of the invention, said device further comprises an eccentric center disc formed on its outer periphery with a gear concentric to said crankshaft and supporting said eccentric shifter in a manner enabling said eccentricity relative to said crankshaft to change, a support shaft fixed to a frame of said bicycle and in parallel with said crankshaft, a bracket whose end is fitted on said support shaft, a wire reel integrally formed with a pinion being fitted on said support shaft, a gear casing whose one end is fitted on said support shaft, a stationary side gear arranged in said gear casing having a one-way clutch on its inner circumferential surface and in mesh with said gear of said eccentric center disc, a sector gear fixed to a shaft passing through the other end of said gear casing and in mesh with said pinion, an intermediate gear rotatably fitted on said shaft having said sector gear fixed thereto in said gear casing and in mesh with said stationary side gear, a rocking arm having a pivotal end fixed to said shaft extending out of said gear casing, a pin extending from a free end of said rocking arm, a moving side gear rotatably fitted on said pin and in mesh with said intermediate gear and a gear formed in a circumferential surface of said eccentric shifter, a spring for urging said shaft having said gear sector to said stepless speed change device, and an operating wire extending around said wire reel for driving it.

In a further embodiment of the invention, a sleeve is rotatably fitted through a bearing on said crankshaft and formed on its one end with said sun gear in mesh with said planetary gears and on the other end with said crank gear having two circular shoulders, and said eccentric center disc is formed with a center hole rotatably fitted on one of said circular shoulders of the sleeve and on its end surface with an eccentric disc extending therefrom eccentric to the center hole, said eccentric shifter being formed with an eccentric hole rotatably fitted on said eccentric disc of said eccentric center disc, and said eccentric shifter comprising two rings fixed thereto and a further ring having said circular track and rotatable in said two rings.

In order that the invention may be more clearly understood, preferred embodiments will be described, by way of example, with reference to the accompanying drawings.

DETAILED DESCRIPTION OF THE PREFERRED EMBODIMENT

Figure 2:
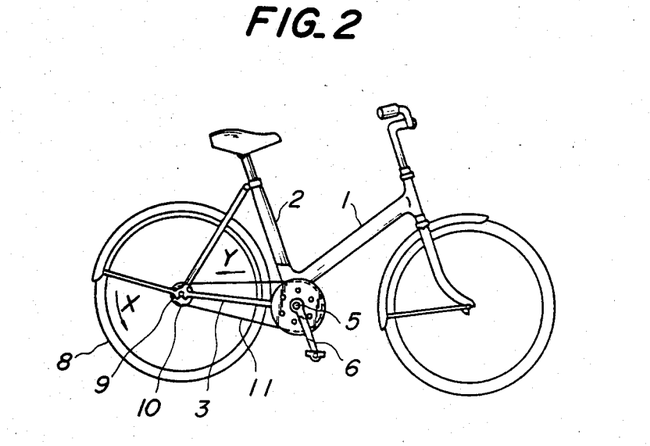
FIG. 2 is a side view of a bicycle equipped with the device according to the invention.

FIG. 2 illustrates a bicycle to which the invention is applicable, which includes a front tube or down tube 1, a seat tube 2, chain stays 3, a bottom bracket 4 (FIG. 3), a bottom bracket spindle or crankshaft 5, crank arms 6 fitted to the bottom bracket spindle 5, lock nuts 7 for the crank arms 6, a rear wheel 8, a rear hub spindle 9, a rear hub sprocket 10 and a chain 11.

In this embodiment, a hollow disc-like carrier 12 having a cover 12a detachably secured to the carrier 12 by means of set screws 12b is fixed through the crank arm 6 to each end of the crankshaft 5. A plurality (six in this embodiment) of planetary members 13 in the form of shouldered discs are rotatably supported angularly equally spaced from each other by shafts 14 with the aid of bearings 15 interposed therebetween in the carrier 12.

In this case, the planetary members 13 of the shouldered discs having enlarged diameter portions 13a and reduced diameter portions 13b are arranged in such a manner as to alternately reverse adjacent members' enlarged diameter portions and reduced diameter portions. A planetary gear 16 in the form of a ring is fitted on the enlarged diameter portion of each planetary member 13 through a one-way clutch thereon so as to be able to rotate on the planetary member in one direction. In this manner, the two sets of planetary gears 16 are in two different planes perpendicular to an axial direction of the crankshaft 5.

In other words, in this embodiment, three planetary gears 16 are arranged on an outer side in the carrier 12, while the remaining three planetary gears 16 are arranged on an inner side in the carrier 12 without any interference with each other.

Figure 6:
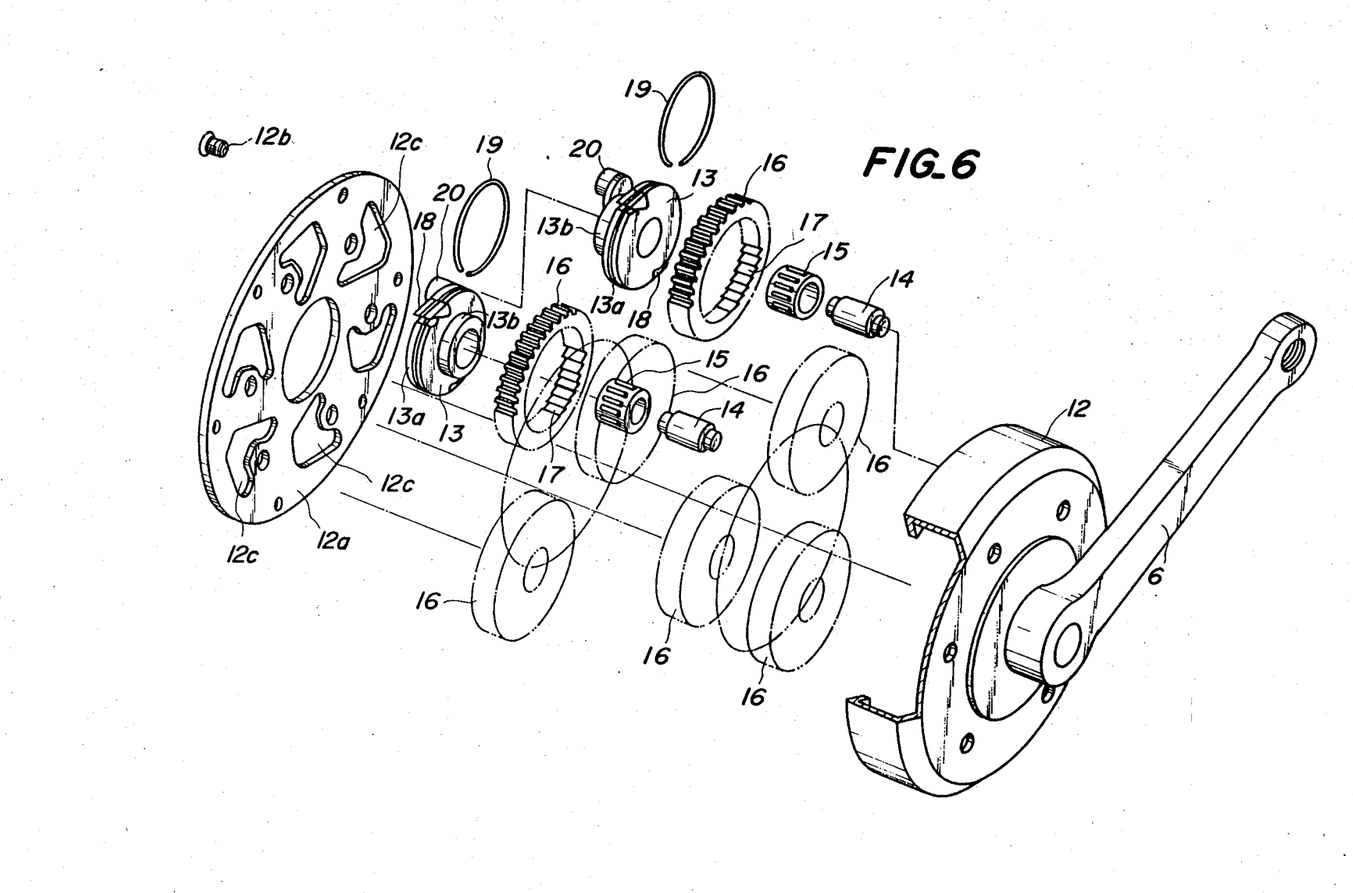
FIG. 6 is an exploded perspective view of the parts shown in FIG. 3.
Figure 7:
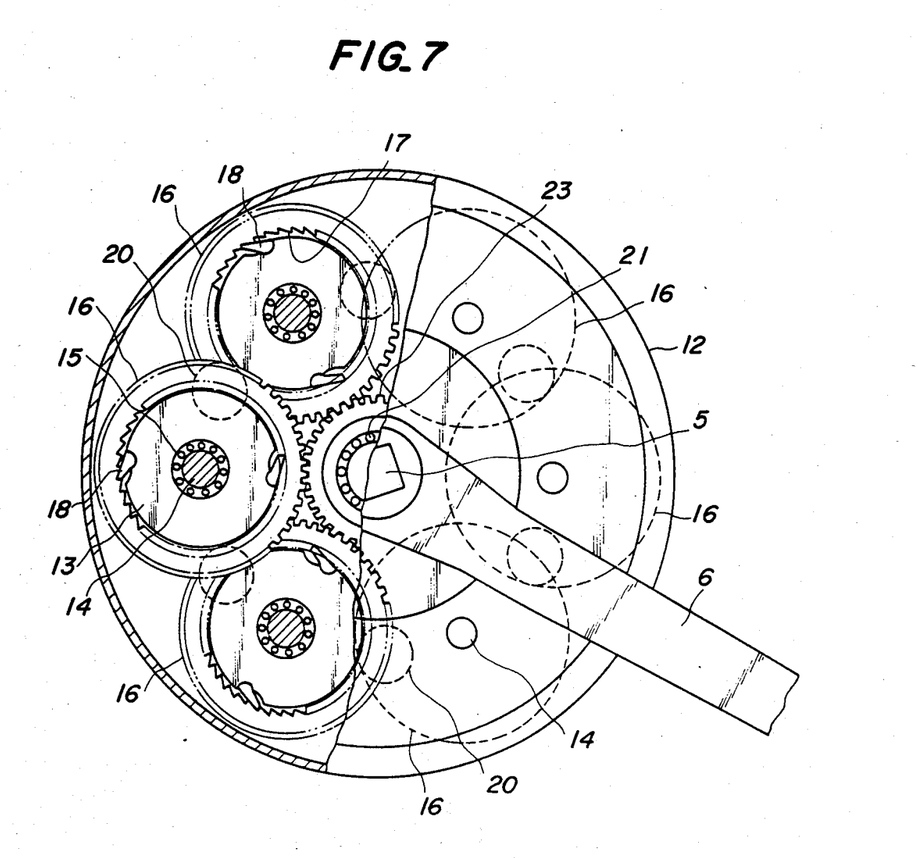
FIG. 7 is a partial sectional view illustrating the carrier and other members of the device according to the invention.
Figure 8:
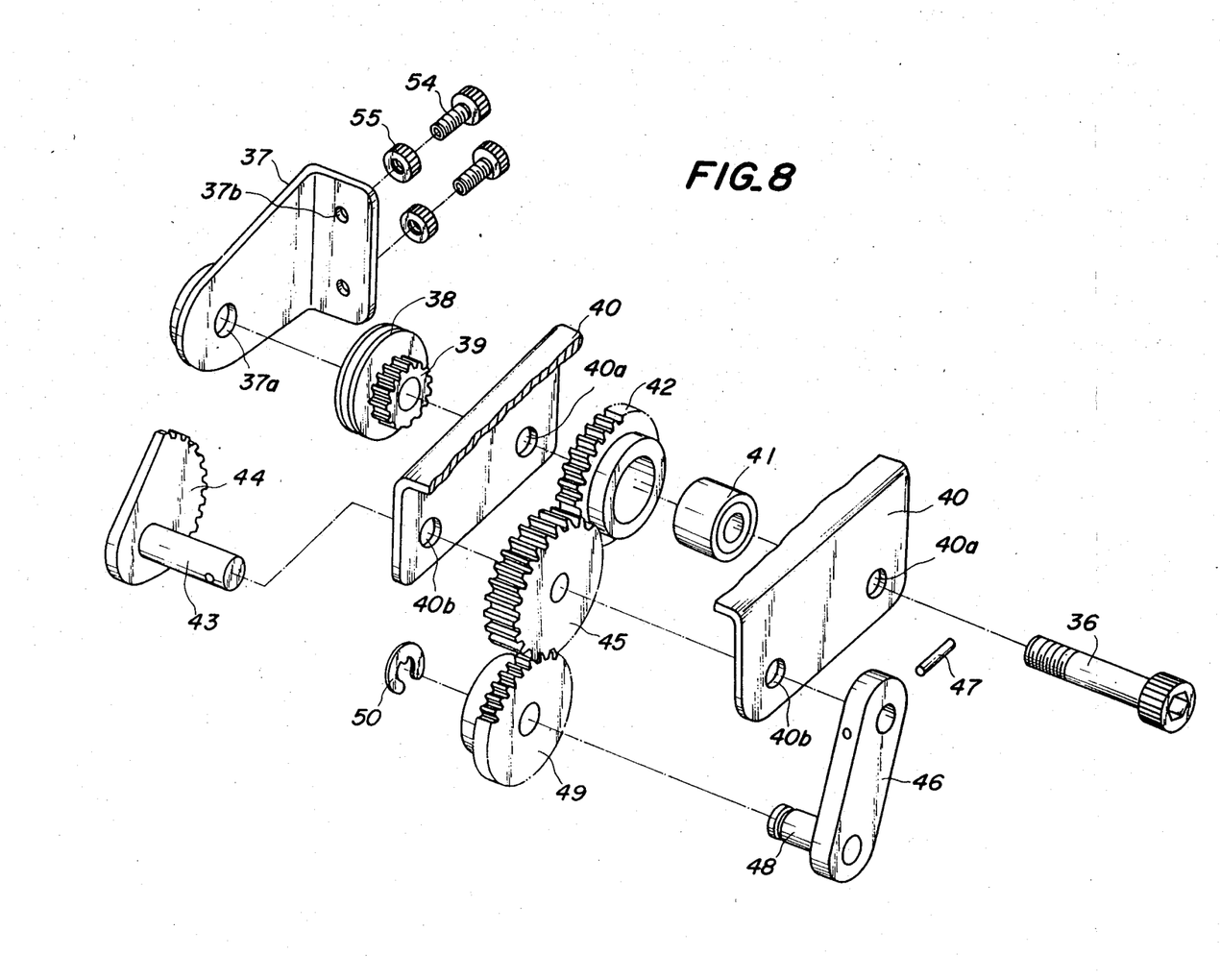
FIG. 8 is an exploded perspective view of the eccentric operating and reverse input allowing device included in the stepless speed change device according to the invention.

One-way clutches of any type may be used for the above one-way clutches. In this embodiment as shown in FIGS. 6 and 7, each planetary gear 16 is formed in its inner circumferential surface with ratchets 17 and the planetary member 13 is provided on its enlarged diameter portion 13a with pawls 18. The pawls 18 are urged by a spring 19 so as to be brought into engagement with the ratchets 17 to prevent the planetary gear 16 from rotating in one direction.

Each planetary member 13 is provided on its one end face (an inner end face in this embodiment) with a rocking pin 20 extending therefrom in parallel with and shifted from the shaft 14. On the other hand, the cover 12a of the carrier 12 is formed with notches 12c which permit the rocking pins 20 to rock and extend out of the carrier 12 as shown in FIG. 6.

Figure 3:
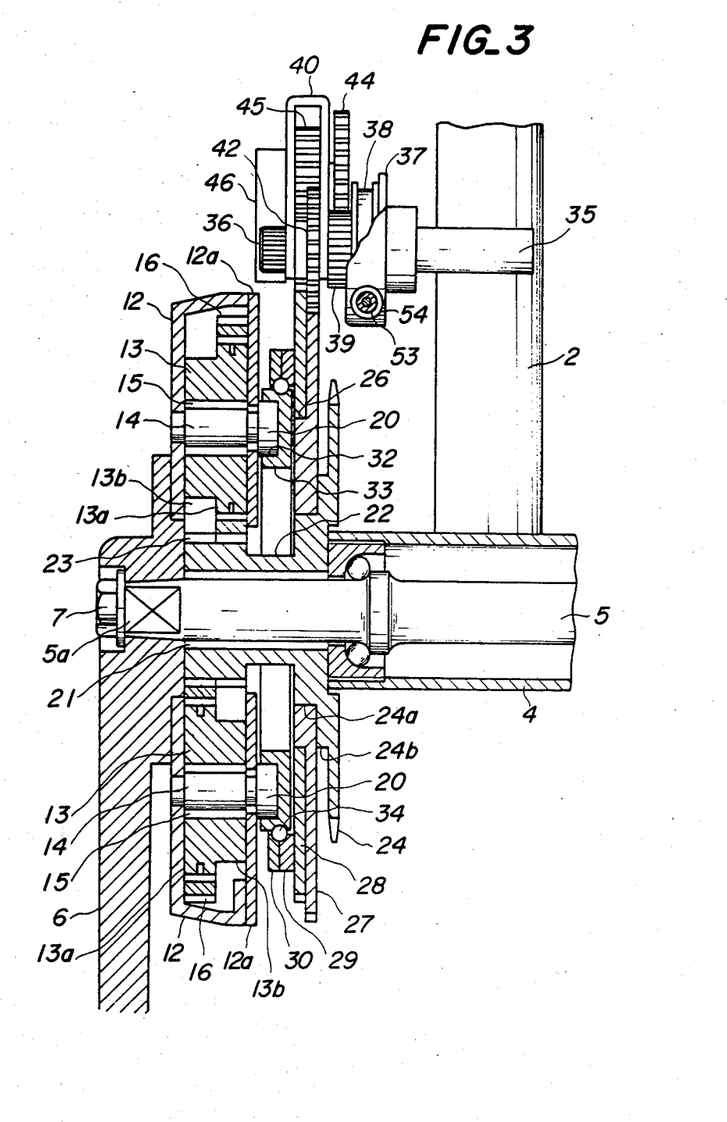
FIG. 3 is a sectional view of a stepless speed change device according to the invention.
Figure 4:
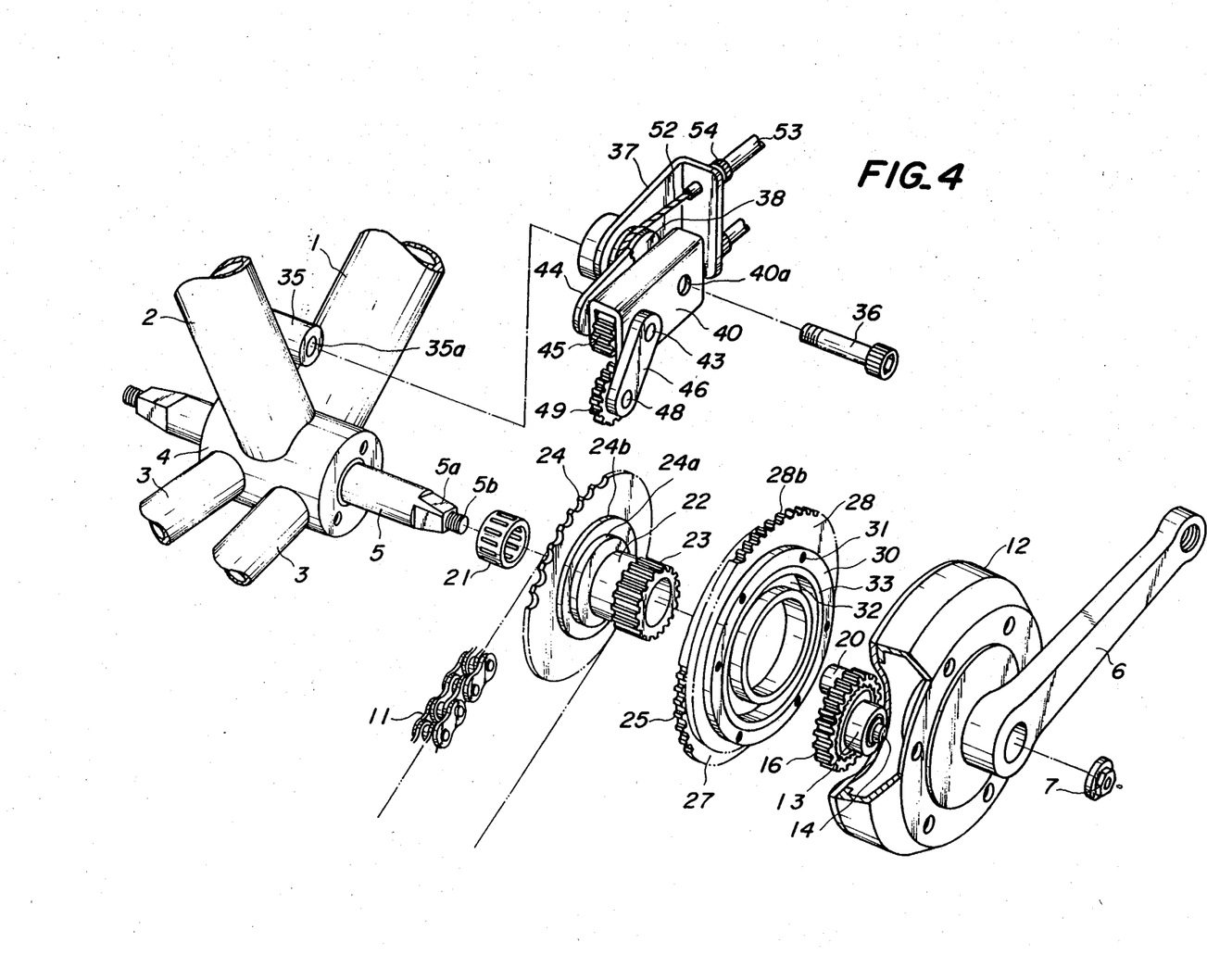
FIG. 4 is an exploded perspective view of the device shown in FIG. 3.
Figure 5:
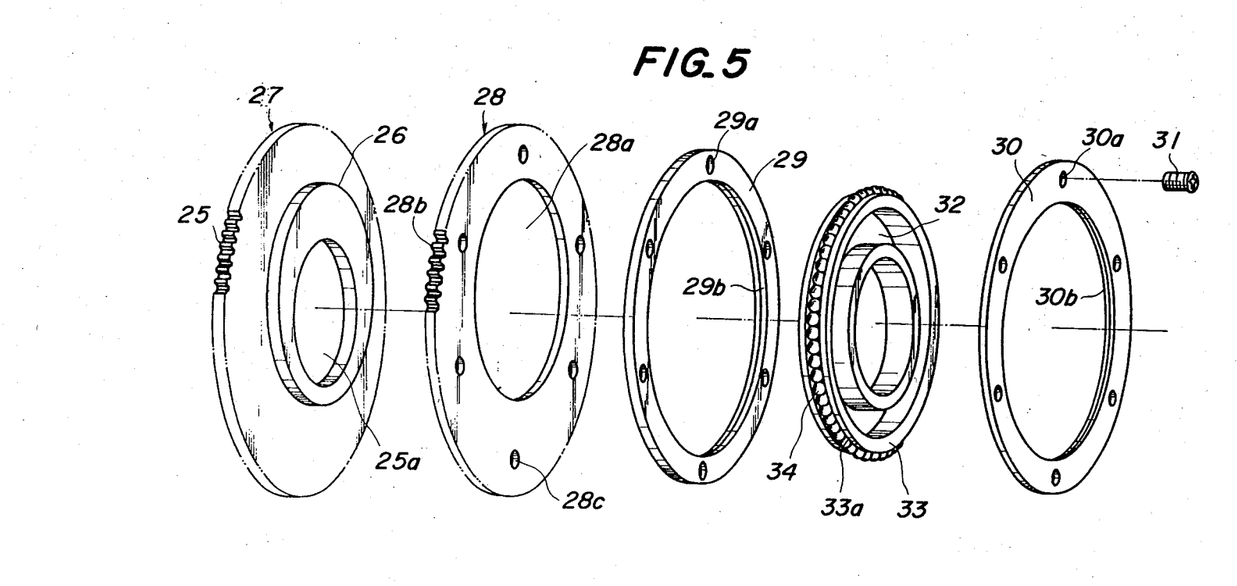
FIG. 5 is an exploded perspective view of the parts shown in FIG. 3.

As shown in FIGS. 3 and 4, moreover, on each end of the crankshaft 5 is rotatably fitted through a bearing 21 a sleeve 22 which is formed on its one end with a sun gear 23 in mesh with the planetary gears 16 and on the other end with a crank gear 24 having two circular shoulders 24a and 24b. An eccentric center disc 27 is formed with a center hole 25a adapted to be rotatably fitted on the circular shoulder 24a of the sleeve 22, and is further formed on its outer periphery with a gear 25 concentric to the crankshaft 5 and on its end surface with an eccentric disc 26 extending therefrom and eccentric to the center hole 25a (FIG. 5).

An eccentric shifter 28 is formed with an eccentric hole 28a adapted to rotatably fit on the eccentric disc 26 of the eccentric center disc 27 and is further formed on its outer circumference with a gear 28b and with a plurality of screw-threaded apertures 28c in a circle. To the eccentric shifter 28 are attached two rings 29 and 30 by means of set screws 31 screwed in the screw-threaded apertures 28c of the eccentric shifter 28 and passing through apertures 29a and 30a respectively formed in the rings 29 and 30. The rings 29 and 30 are formed with ball-fitting grooves 29b and 30b in their adjacent inner peripheries connected with each other to form a circular groove having a semicircular cross-section. A ring 33 is formed in its one end surface with a circular track 32 adapted to slidably fit therein the above rocking pins 20 of the planetary members 13. The ring 33 is further formed in its outer circumference with a ball-fitting groove 33a having a semicircular cross-section. A number of balls 34 are arranged between the ball-fitting groove 33a and the circular groove formed by the ball-fitting grooves 29b and 30b so that the ring 33 is rotatably mounted onto the eccentric shifter 28.

As shown in FIG. 3, these members are fitted on the sleeve 22 having the sun gear 23 and the crank gear 24 fitted through the bearing 21 on the crankshaft 5 in the manner that the eccentric center disc 27 is fitted on the circular shoulder 24a of the sleeve 22, and the eccentric shifter 28 having the ring 33 mounted thereon is fitted on the eccentric disc 26 of the center disc 27 so that the rocking pins 20 extending from the respective planetary members 13 are inserted in the circular track 32 of the ring 33. The carrier 12 is arranged about the sun gear 23 to bring the planetary gears 16 into engagement with the sun gear 23 in the carrier 12. The crank arm 6 is fitted on a square cross-sectional end 5a of the crankshaft 5 and fixed to the carrier 12, and a lock nut 7 is threadedly engaged and tightened on a threaded end 5b of the crankshaft 5 to complete the assembly of these members (FIG. 4).

The stepless speed change device according to the invention requires provision of an eccentric operating device and a reverse input allowing device in reverse rotation. FIGS. 3 and 4 and FIGS. 8-12 illustrate as one example an eccentric operating and reverse input allowing device having both the operations of the two devices.

As shown in FIGS. 3 and 4, this device comprises a pin cylinder 35 having a screw-threaded aperture 35a (FIG. 4) fixed in parallel with the crankshaft 5 to the seat tube 2 as by means of welding, a support shaft 36 like a bolt adapted to be screwed into the aperture 35a, a bracket 37 whose end has an aperture 37a in which the support shaft 36 is fitted, a wire reel 38 having a pinion 39 integrally formed therewith being fitted together on the support shaft 36 and a U-shaped gear casing 40 fitted on the support shaft 36 passing through an aperture 40a formed in one end of the casing 40. In the gear casing 40, there is provided a stationary side gear 42 having a one-way clutch 41 therein and in mesh with the gear 25 of the eccentric disc 27.

Figure 11:
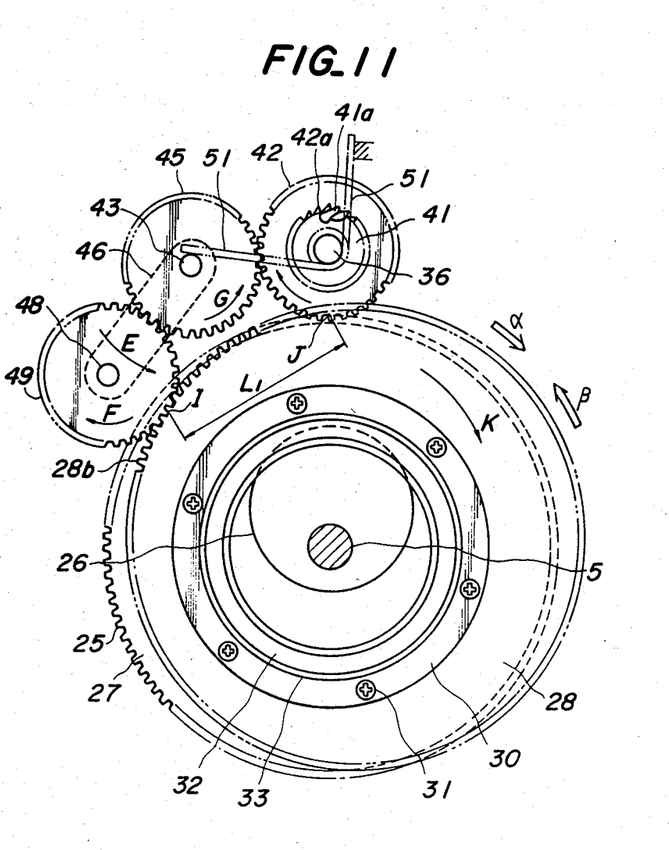
Figure 12:
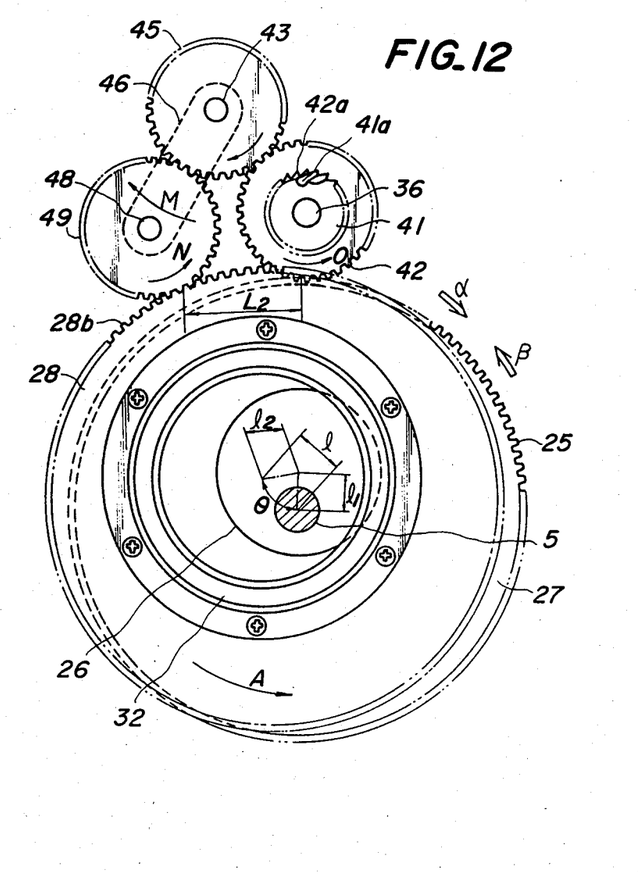

A one-way clutch of any kind can be used as the clutch 41. As shown in FIGS. 11 and 12, for example, the stationary side gear 42 is formed in its inner circumference with ratchets 42a and the one-way clutch 41 is formed in its outer circumference with a pawl 41a fixed to the support shaft 36 and adapted to engage the ratchets 42a so as to allow one directional rotation of the gear 42.

The gear casing 40 is further formed in the other end with an aperture 40b. A sector gear 44 is fixed to one end of a shaft 43 passing through the aperture 40b. An intermediate gear 45 is rotatably fitted on the shaft 43 extending in the gear casing 40 and is in mesh with the stationary side gear 42. The shaft 43 extending out of the gear casing 40 is fitted in a pivotal end of a rocking arm 46 and fixed thereto by a pin 47.

The rocking arm 46 is provided in its free end with a pin 48 extending therefrom on which is rotatably fitted a moving side gear 49 in mesh with the intermediate gear 45 and the gear 28b of the eccentric shifter 28. The number of teeth of the moving side gear 49 is equal to that of the stationary side gear 42. A reference numeral 50 denotes a snap ring for preventing removal of the gear 49 from the pin 48. Moreover, a spring such as shown in phantom lines 51 in FIG. 11 is provided to normally urge the shaft 43 in a counterclockwise direction viewed in FIG. 10.

Figure 9:
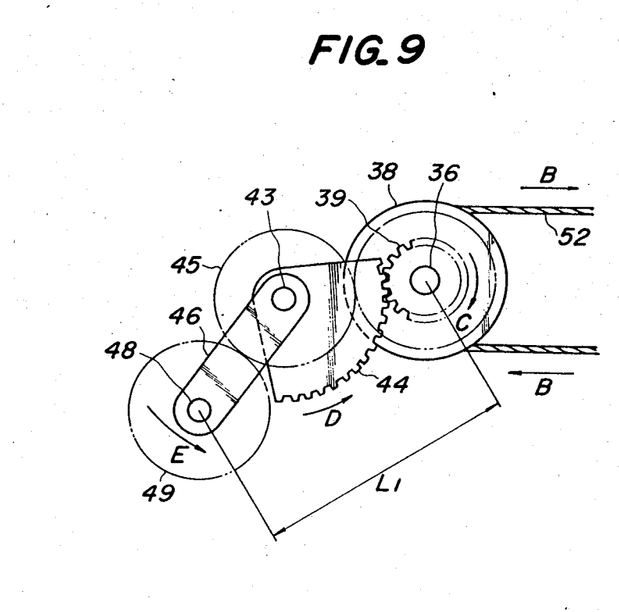
FIGS. 9, 10, 11 and 12 are partial views for explaining the operation of the eccentric operating and reverse input allowing device.
Figure 10:
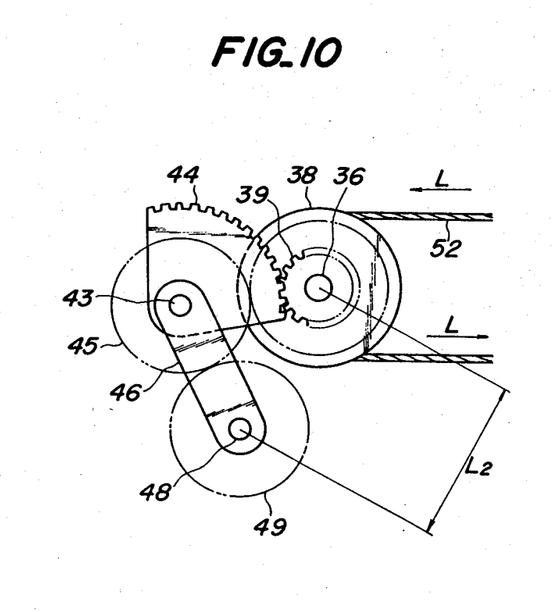

Moreover, as shown in FIGS. 9 and 10, an operating wire 52 extends about the wire reel 38 so as to drive it. An outer wire of the operating wire 52 is illustrated at 53 in FIG. 4. An adjusting screw 54 (clearly shown in FIG. 8) for adjusting the outer wire 53 is screwed in a screw-threaded aperture 37b formed in the bracket 37 and locked by a lock nut 55.

The operation of the device constructed in the above described manner will be explained hereinafter. Referring to FIG. 12, $l_1$ is an eccentricity of the eccentric disc 26 relative to the crankshaft 5, and $l_2$ is an eccentricity of the circular track 32 of the eccentric shifter 28 relative to the eccentric disc 26. Assuming now $l_1=l_2$, an eccentricity l of the circular track 32 relative to the crankshaft 5 in the state shown in FIG. 12 is $2l_1 \sin \theta/2$. When the eccentric shifter 28 in the state shown in FIG. 12 is rotated in a direction of an arrow A into the state shwon in FIG. 11, the eccentricity of the circular track 32 relative to the crankshaft 5 becomes zero. In other words, by operating the eccentric shifter 28 between the states shown in FIGS. 11 and 12, the eccentricity of the circular track 32 relative to the crankshaft 5 can be set at any values in stepless manner.

The operation of the eccentric shifter 28 is effected in the following manner. In changing the zero eccentricity shown in FIG. 11 to the eccentricity shown in FIG. 12, the wire 52 shown in FIG. 9 is pulled in the direction of arrows B. In this manner, the pinion 39 is rotated in a clockwise direction C as viewed in FIG. 9 with the aid of the reel 38 to rotate the sector gear 44 and the shaft 43 in a direction shown by an arrow D, so that the rocking arm 46 fixed to the shaft 43 is pivotally moved in a direction shown by an arrow E. When the arm 46 is rocked in the direction E, the moving side gear 49 is somewhat rotated in a direction shown by an arrow F in FIG. 11 because the moving side gear 49 is in mesh with the gear 28b of the eccentric shifter 28, unless the eccentric shifter 28 is moved. As a result, the intermediate gear 45 is rotated in a direction shown by an arrow G to rotate the stationary side gear 42 in a direction shown by an arrow H. In this case, the rotation of the stationary side gear 42 is not obstructed because the one-way clutch 41 in the stationary side gear 42 slides relative thereto.

As the gears 49 and 42 have the teeth of the same number and rotate in the same direction, if a distance $L_1$ between the engaged point I of the gears 49 and 28b and the engaged point J of the gears 42 and 25 did not change, the relative position between the eccentric center disc 27 and the eccentric shifter 28 would not change. However, when the sector gear 44 moves from the position shown in FIG. 9 to that shown in FIG. 10, the gears 49, 45 and 42 change from the state shown in FIG. 11 to that shown in FIG. 12, with the result that the distance $L_1$ changes to $L_2$ shown in FIG. 12. Accordingly, the eccentric shifter 28 is rotated in a direction shown by an arrow K in FIG. 11 relative to the eccentric center disc 27 by a distance equal to the difference $L_1-L_2$.

As the result, a eccentric shifter 28 is rotated from the state shown in FIG. 11 to that shown in FIG. 12 relative to the eccentric center disc 27, so that the center of the circular track 32 connected to the eccentric shifter 28 moves to a position eccentric by the distance l from the center of the crankshaft 5.

To return the state shown in FIG. 12 to that of the zero eccentricity shown in FIG. 11, the operating wire 52 is pulled in a direction reverse to the direction in the above operation, i.e. the direction shown by arrows L in FIG. 10.

In this case, the arm 46 is pivotally moved in a direction shown by an arrow M in FIG. 12. If the eccentric shifter 28 did not move, the gear 49 would rotate in a direction shown by an arrow N and hence the gear 42 would rotate in a direction shown by an arrow O. Since, however, the gear 42 is prevented from rotating in the direction O by the one-way clutch 41 fixed to the support shaft 36, the eccentric center plate 27 does not rotate. Accordingly, the eccentric shifter 28 moves by the difference $L_1-L_2$ in the direction A in FIG. 12 into the state of zero eccentricity.

The operation of the stepless speed change device according to the invention will be explained hereinafter by referring to FIGS. 13 and 14.

Figure 13:
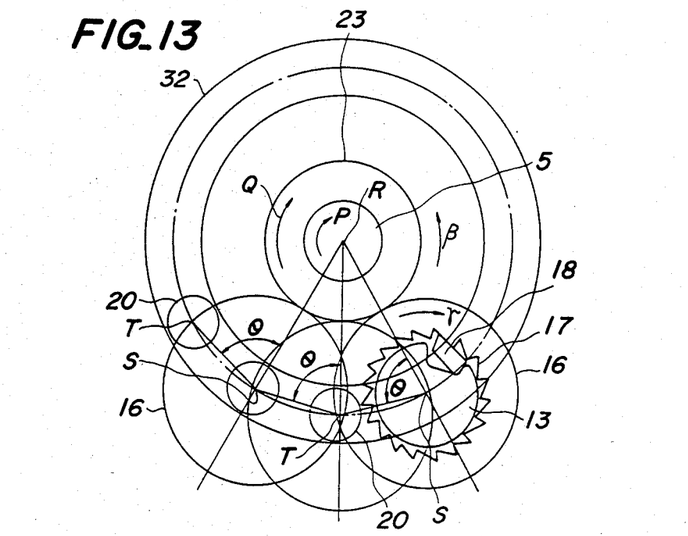
FIGS. 13 and 14 are schematic views for explaining the operation of the device according to the invention.

FIG. 13 is the view for explaining the relations between the crankshaft 5, the circular track 32, the planetary member 13, the planetary gear 16, the rocking pin 20 and the sun gear 23 in the state shown in FIGS. 6 and 10.

Starting from the state shown in FIGS. 6 and 10, when the crankshaft 5 is rotated in a direction shown by an arrow P by the crank arm 6, the carrier 12 joined to the crank arm 6 as shown in FIG. 3 is rotated together with the crank shaft 5, so that the planetary members 13 and the planetary gears 16 are rotated together with the carrier 12. In this case, as the rocking pins 20 extending from the planetary members 13 are rotated extending in the circular tracks 32 eccentric to the shaft 5, the planetary members 13 are not rotated relative to the carrier 12.

As the planetary gears 16 engage with the sun gear 23, the planetary gears 16 tend to rotate in clockwise directions as viewed in FIG. 13 owing to the resistance of the sun gear 23. However, such a rotation of the planetary gears 16 is prevented by one-way clutches each consisting of ratchets 17 and pawls 18. Accordingly, the sun gear 23 is rotated together with the crankshaft 5 in a direction shown by an arrow Q by the planetary gears 16 rotating together with the carrier 12. In this case, therefore, the transmission ratio is 1:1.

Figure 14:
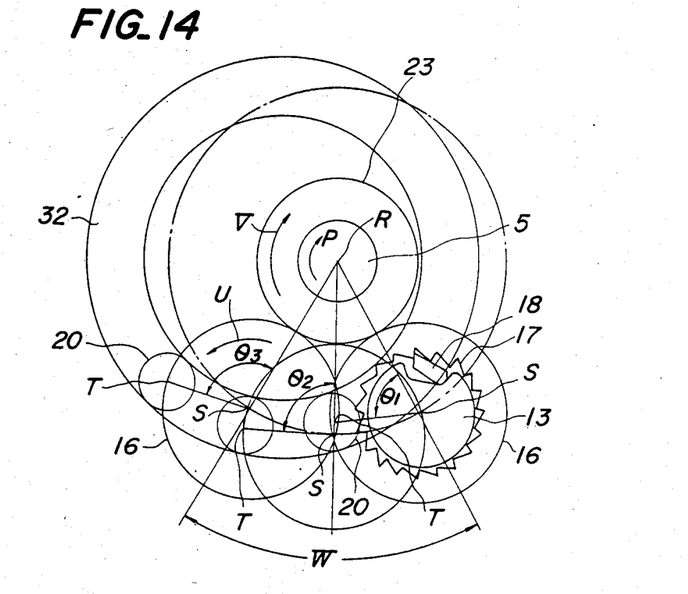

In the case where the eccentric shifter 28 is brought into the eccentric state shown in FIGS. 12 and 14 by speed change operation, as the crankshaft 5 is rotated in the direction P, the carrier 12 is rotated together with the crankshaft 5 as above described, so that the planetary members 13 are rotated together with the shafts 14. In this case, as the circular tracks 32 within which the rocking pins 20 are fitted are eccentric to the crankshaft 5, the planetary members 13 rotate to the carrier 12 moment by moment.

In more detail, an angle RST or $\theta$ formed by a center R of the crankshaft 5, a center S of the planetary member 13 and a center T of the rocking pin 20 is always constant in the case shown in FIG. 13, but changes as $\theta_1$, $\theta_2$ and $\theta_3$ in the case shown in FIG. 14, where there is a relation $\theta_1 < \theta_2 < \theta_3$.

Namely, the planetary gear 16 is caused to rotate in a direction shown by an arrow U as shown in FIG. 14. The rotation of the planetary gear 16 in the direction U about the center S and the revolution of the planetary gear 16 in the direction P about the crankshaft 5 cause the sun gear 23 to rotate in a direction shown by an arrow V in FIG. 14 at a higher speed than that of the crankshaft 5. As the planetary gears are six in this embodiment, the planetary gears 16 which are not in increased rotating speed zones are not driven at higher speeds, but only one planetary gear 16 in the most increased rotating speed zone among the six planetary gears 16 drives the sun gear 23. In contrast herewith, the remaining five planetary gears 16 are rotated by the sun gear 23, while the ratchets 17 of the planetary gears 16 slide on the pawls 18.

Figure 15:
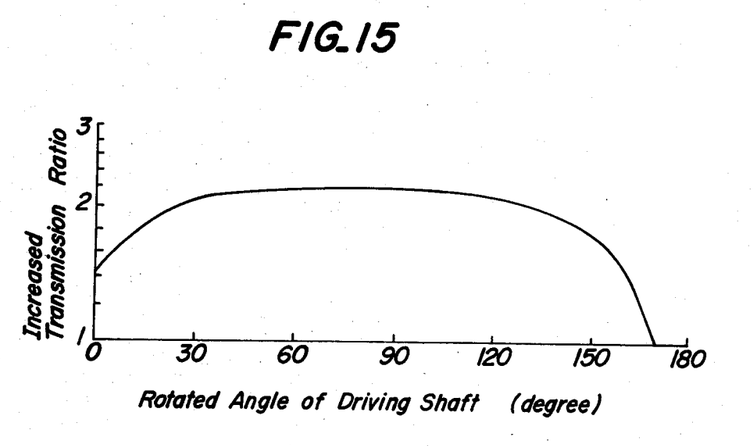
FIG. 15 is a graph illustrating the increased speed characteristics of the apparatus according to the invention.

FIG. 15 illustrates the increased speed characteristics of the apparatus according to the invention wherein an ordinate indicates increased transmission ratio and an abscissa indicates rotated angles of the crankshaft 5.

As can be seen from FIG. 15, it is preferable to increase the number of the planetary gears 16 in order to decrease the variation in transmission ratio. As the six planetary gears 16 are used in this embodiment, the angle zone W (about 60°) shown in FIG. 14 is the driving zone of each planetary gear 16 for the sun gear 23. It is clearly evident from FIG. 14 that in this embodiment the rotating drive force can be obtained without pulsation even in increasing the rotating speed.

Although the cases of the zero increased speed ratio and the maximum increased speed ratio have been explained, it is of course clear that any desired transmission ratios can be obtained in stepless manner by setting the rotated angles of the eccentric shifter 28 in any intermediate values between those shown in FIGS. 11 and 12 according to the invention.

The operation of the stepless speed change device according to the invention has been explained. It is assumed that a bicycle equipped with the stepless speed change device retracts by gravity when the bicycle is stopped, for example, on a slope. In this case, the rear wheel 8 is rotated in a direction shown by an arrow X and the chain 11 is moved in a direction shown by an arrow Y in FIG. 2, so that a reverse input acts on the crank gear 24 of the stepless speed change device according to the invention.

When the reverse input acts on the crank gear 24, a self-locking occurs to prevent the reverse rotation of the device due to its mechanism in case of high transmission ratio, so that extra forces act on components of the device. In putting the device according to the invention to practical use, a reverse input allowing device is needed in the reverse rotation.

The above mentioned eccentric operating device has the performance of the reverse input allowing device, whose operation will be explained hereinafter.

Referring back to FIGS. 11 and 12, the carrier 12 is rotated in the direction shown by an arrow $\alpha$ in the normal rotation, in the direction shown by an arrow $\beta$ in the reverse direction.

In the reverse rotation of the rear wheel 8 above mentioned, wherein the rotation is transmitted to the respective planetary gears 16 in the direction of the arrow $\beta$ as shown in FIG. 13, the respective planetary gears 16 tend to rotate in the direction shown by arrows $\gamma$. As the rotation of the planetary gears 16 is in the direction $\gamma$, the gears 16 rotate in the direction $\beta$ together with the carrier 12. In this case, as shown in FIGS. 11 and 13, the rocking in 20 integral with the planetary member 13 in the planetary gear 16 can rotate in the circular track 32 without the above mentioned self-locking when the eccentricity of the circular track 32 relative to the crankshaft 5 is zero. However, when the circular track 32 is eccentric relative to the crankshaft 5 as shown in FIGS. 12 and 14, the planetary member 13 must rotate somewhat about its axis in order that the rocking pin 20 passes through the circular track 32. Notwithstanding, however, when the rear wheel is rotated in the reverse direction, the planetary gear 16 is prevented from rotating as above mentioned, so that the planetary member 13 cannot be freely rotated either.

The self-rocking occurs in this manner. According to the invention, when such a self-locking occurs, the ring 33 forming the circular track 32 rotates in the direction shown by the arrow $\beta$ together with the eccentric shifter 28 and the carrier 12 in unison. When the eccentric shifter 28 is rotated, the eccentric center plate 27 is also rotated by the same angular displacement in the direction shown by the arrow $\beta$ through the gears 28b, 49, 45, 42 and 25, so that the whole speed change device is ultimately rotated together with the crank gear 24 in the same direction. The above mentioned self-locking is therefore sufficiently absorbed by these operations.

In this reverse rotation, moreover, the eccentric center plate 27 and the eccentric shifter 28 rotate together by the same angular displacement in the same direction, so that the relative position therebetween is not changed and therefore the transmission ratio is kept constant.

As can be seen from the above description, the stepless speed change device according to the invention is arranged on a crankshaft rather than a rear hub spindle so as to make large a ratio of a diameter of a crank gear to that of a rear hub sprocket and to make small the entire transmission device.

With a stepless speed change device of this kind, increase in speed is in general effected by a planetary gear device whose speed-up transmission ratio is determined by a ratio of a diameter of a planetary gear to that of a sun gear, and pulsations become small with an increase in number of used planetary gears. Under the circumstances, in the event that all the planetary gears P and the sun gear S are arranged in a plane as in the prior art, if the number of the planetary gears P is increased, a diameter of the sun gear S becomes larger to make small the speed-up transmission ratio, while if diameters of the planetary gears P are made larger in comparison with that of the sun gear S so as to make larger the speed-up transmission ratio, the number of the planetary gears P becomes less to make large the pulsations as shown in FIGS. 1a–1c.

Figure 16:
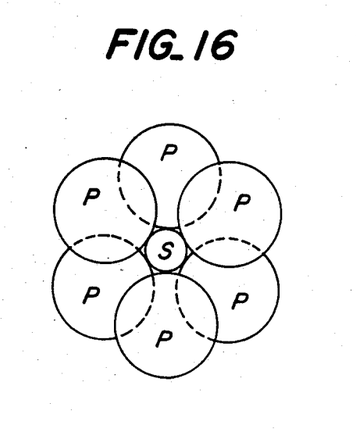
FIG. 16 is a schematic view illustrating an arrangement of planetary gears and a sun gear according to the invention.

With the stepless speed change device according to the invention, however, the planetary gears are duplicately arranged relative to the crankshaft as shown in FIG. 16 to make it possible to make much larger the diameters of the planetary gears P than that of the sun gear so as to make much larger the speed-up transmission ratio and at the same time so as to increase the number of the planetary gears P to make small pulsations in transmission force.

Moreover, the speed change operating and reverse input allowing device according to the invention effectively brings the stepless speed change device into practical use. The speed change operating device has for itself the performance of the reverse input allowing device, so that the device becomes light weight and small-sized as a whole.

It is further understood by those skilled in the art that the foregoing description is that of preferred embodiments of the disclosed devices and that various changes and modifications may be made in the invention without departing from the spirit and scope thereof.

What is claimed is:

1. A stepless speed change device for a bicycle comprising:
   a carrier fixed to a crankshaft for the bicycle;
   a plurality of planetary members rotatably journaled in said carrier into parallel planes perpendicular to said crankshaft;
   planetary gears respectively fitted on said planetary members through one-way clutches so as to rotate in one direction;
   rocking pins eccentric to and extending from said planetary members;
   an eccentric shifter having a circular track connected thereto for guiding said rocking pins and enabling its eccentricity relative to said crankshaft to change;
   a sun gear in mesh with said planetary gears and integrally connected to a crank gear as an output portion of the device;
   an eccentric center disc formed on its outer periphery with a gear concentric to said crankshaft and supporting said eccentric shifter in a manner enabling said eccentricity relative to said crankshaft to change;
   a support shaft fixed to a frame of said bicycle and in parallel with said crankshaft;
   a bracket whose end is fitted on said support shaft;
   a wire reel integrally formed with a pinion being fitted on said support shaft;
   a gear casing whose one end is fitted on said support shaft;
   a stationary side gear arranged in said gear casing having a one-way clutch on its inner circumferential surface and in mesh with said gear of said eccentric center disc;
   a sector gear fixed to a shaft passing through the other end of said gear casing and in mesh with said pinion;
   an intermediate gear rotatably fitted on said shaft having said sector gear fixed thereto in said gear casing and in mesh with said stationary side gear;
   a rocking arm having a pivotal end fixed to said shaft extending out of said gear casing;
   a pin extending from a free end of said rocking arm;
   a moving side gear rotatably fitted on said pin and in mesh with said intermediate gear and a gear formed on a circumferential surface of said eccentric shifter;
   a spring for urging said shaft having said gear sector toward said moving side gear and said eccentric shifter; and
   an operating wire extending around said wire reel for driving it.

2. A stepless speed change device as set forth in claim 1, wherein said planetary members comprise reduced diameter portions and enlarged diameter portions on which said planetary gears are arranged, and said planetary members are arranged in such a manner as to alternately reverse adjacent members' enlarged diameter portions and reduced diameter portions so as to be in said two parallel planes.

3. A stepless speed change device as set forth in claim 2, wherein six planetary members and six planetary gears are provided, and among them three planetary gears are arranged on an outer side in the carrier, while the remaining three planetary gears are arranged on an inner side in the carrier.

4. A stepless speed change device as set forth in claim 1, wherein a sleeve is rotatably fitted through a bearing on said crankshaft and formed on its one end with said sun gear in mesh with said planetary gears and on the other end with said crank gear having two circular shoulders.

5. A stepless speed change device as set forth in claim 1, wherein a sleeve is rotatably fitted through a bearing on said crankshaft and formed on its one end with said sun gear in mesh with said planetary gears and on the other end with said crank gear having two circular shoulders, and said eccentric center disc is formed with a center hole rotatably fitted on one of said circular shoulders of the sleeve and on its end surface with an eccentric disc extending therefrom eccentric to the center hole, said eccentric shifter being formed with an eccentric hole rotatably fitted on said eccentric disc of said eccentric center disc, and said eccentric shifter comprising two rings fixed thereto and a further ring having said circular track and rotatable in said two rings.

6. A stepless speed change device as set forth in claim 5, wherein said two rings are formed with ball-fitting grooves in their adjacent inner peripheries connected with each other to form a circular groove having a semicircular cross-section, and said further ring is formed on its outer circumference with a ball-fitting groove having a semicircular cross-section, a number of balls arranged between said ball-fitting groove and said circular groove formed by said ball-fitting grooves.

7. A stepless speed change device as set forth in claim 1, wherein a pin cylinder having a screw-threaded aperture in parallel with the crankshaft is welded to a seat tube of said bicycle, said support shaft being threadedly engaged in the screw-threaded aperture.

8. A stepless speed change device as set forth in claim 1, wherein said one-way clutch of the stationary side gear comprises ratchets formed in an inner circumference of said stationary side gear and a pawl fixed to said support shaft.

* * * * *